United States Patent
Mead

(10) Patent No.: US 8,602,177 B2
(45) Date of Patent: Dec. 10, 2013

(54) LINEAR MOTOR BRAKE

(75) Inventor: Graham Mead, Aylesbury (GB)

(73) Assignee: Illinois Tool Works Inc., Glenview, IL (US)

( * ) Notice: Subject to any disclaimer, the term of this patent is extended or adjusted under 35 U.S.C. 154(b) by 818 days.

(21) Appl. No.: 12/376,749

(22) PCT Filed: Aug. 2, 2007

(86) PCT No.: PCT/IB2007/002233
§ 371 (c)(1),
(2), (4) Date: May 11, 2010

(87) PCT Pub. No.: WO2008/023227
PCT Pub. Date: Feb. 28, 2008

(65) Prior Publication Data
US 2010/0230217 A1    Sep. 16, 2010

(30) Foreign Application Priority Data

Aug. 21, 2006   (GB) .................................. 0616589.8
Sep. 15, 2006   (GB) .................................. 0618209.1

(51) Int. Cl.
*B65H 59/10* (2006.01)

(52) U.S. Cl.
USPC .......................................... 188/67; 188/171

(58) Field of Classification Search
USPC ............ 188/67, 139, 156, 171; 318/362–382
See application file for complete search history.

(56) References Cited

U.S. PATENT DOCUMENTS

| | | | |
|---|---|---|---|
| 4,214,795 A * | 7/1980 | Kakuminato ................... | 303/89 |
| 4,268,093 A * | 5/1981 | Muller ............................ | 303/89 |
| 4,499,977 A * | 2/1985 | Wang ............................. | 188/72.6 |
| 4,798,269 A | 1/1989 | Lindner et al. | |
| 4,938,319 A * | 7/1990 | Ernst .............................. | 188/67 |
| 5,108,066 A * | 4/1992 | Lundstrom .................... | 248/410 |
| 5,823,300 A * | 10/1998 | Higuchi .......................... | 188/67 |
| 6,009,981 A * | 1/2000 | Wolfe ............................ | 188/267 |
| 6,176,639 B1 * | 1/2001 | Fratini et al. ................. | 403/322.1 |
| 6,435,494 B2 * | 8/2002 | Takahashi et al. .............. | 269/32 |
| 6,446,769 B1 | 9/2002 | Kangiser | |
| 2002/0112929 A1 * | 8/2002 | Koshak .......................... | 188/67 |
| 2006/0213729 A1 * | 9/2006 | Jelley et al. ................... | 188/72.3 |

FOREIGN PATENT DOCUMENTS

| | | |
|---|---|---|
| EP | 0 753 670 A1 | 1/1997 |
| EP | 0 753 670 B1 | 11/2000 |
| GB | 1107530 | 3/1968 |
| JP | 62203042 | 9/1987 |

(Continued)

OTHER PUBLICATIONS

International Publication No. WO 2008/023227 A2.

(Continued)

*Primary Examiner* — Bradley King
*Assistant Examiner* — Nicholas J Lane
(74) *Attorney, Agent, or Firm* — McCarter & English, LLP

(57) ABSTRACT

A mechanical brake for arresting movement of the armature of a linear electric motor in the absence of electrical power comprising a pivotably mounted plate (17) having an aperture (19) for receiving a member (10) attached to the armature of the motor, and an electrically operated holding device (23) contacting a free end (21) of the plate and arranged to hold the plate in a condition to permit movement of the member while electrical power is present and to permit the plate to pivot around its second end (20) to a jamming position in the absence of electrical power.

7 Claims, 2 Drawing Sheets

(56) References Cited

FOREIGN PATENT DOCUMENTS

| | | |
|---|---|---|
| JP | 03121725 | 12/1991 |
| JP | 11347873 | 12/1999 |
| JP | 2005291398 | 10/2005 |
| JP | 4041813 | 2/2008 |

OTHER PUBLICATIONS

International Publication No. WO 2008/023227 A3.
Written Opinion of the International Search Authority.
Search Report issued in GB Application No. GB0618209.1 on Dec. 22, 2006.

* cited by examiner

LINEAR MOTOR BRAKE

The present invention relates to linear motors and particularly to a brake for arresting movement of the armature in the absence of electrical power.

Linear motors have many uses but currently attention is being focused on using linear motors as piston and glider type devices to replace hydraulic rams. One such use is in the area of testing equipment where it is proposed to mount a linear motor in the form of an electromagnetic ram in an orientation such that the armature of the motor moves in a vertical or substantially vertical direction. In this orientation, it will be appreciated that in the absence of electrical power, the armature is free to move under the effect of gravity. This can cause difficulties especially where the electromagnetic ram is mounted above a test location where a sample to be tested is positioned.

The present invention has as an object, the provision of a brake which will arrest movement of the armature of an electromagnetic ram substantially immediately power to the ram is lost.

In a preferred embodiment, the brake operates on an extension from the armature. The brake preferably comprises a pivotably mounted plate having an aperture for receiving the extension which projects through the aperture and an electrically actuable holding member contacting the plate and arranged to hold the plate in a position where the extension passes through the aperture without contacting the plate while there is electrical power but permits the plate to pivot so that the extension will come into contact with the edge of the aperture should electrical power cease to be present either due to a fault or a switch-off of the aperture.

Figure 1:
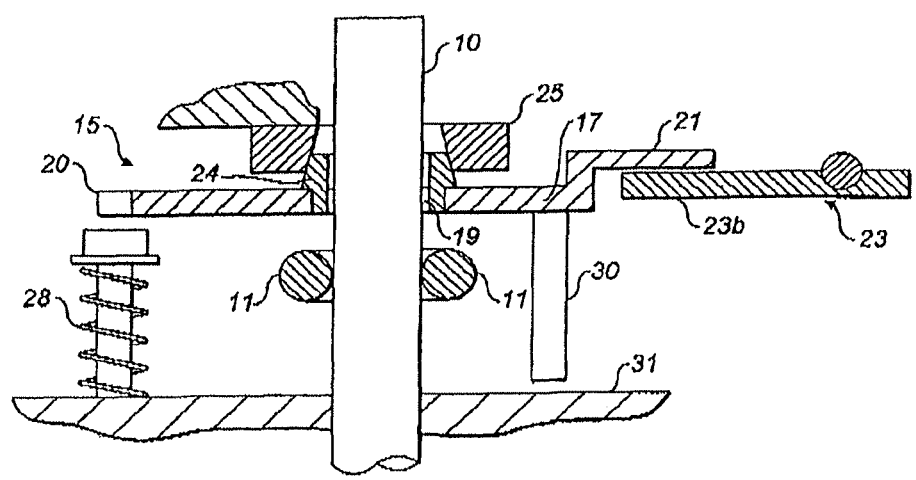
Figure 2:
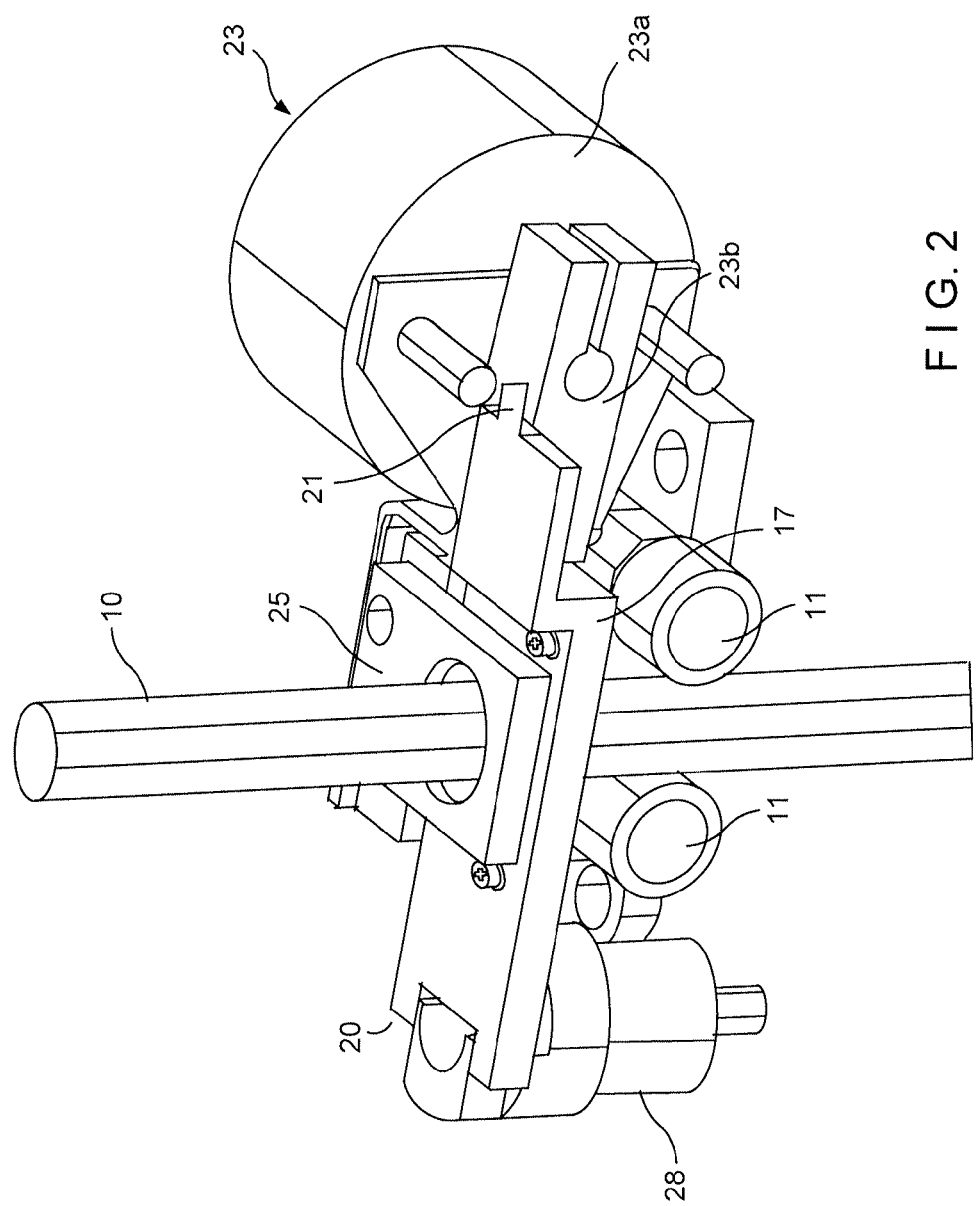

In order that the present invention be more readily understood, an embodiment thereof will now be described by way of example with reference to the accompanying draw up, in which:

FIG. 1 shows a diagrammatic front view of a brake according to the present invention, and FIG. 2 shows a perspective view of the brake shown in FIG. 1.

The preferred embodiment of the present invention is a brake which will automatically come into effect should electrical power to an electromagnetic ram be absent and which will utilize the mass of the armature of the ram, acting under gravity, to generate the braking force.

Turning now to the drawings, the same reference numerals are used to represent the same parts in both views. A rod 10 is attached to the armature of an electromagnetic ram (not shown) so as to act along the axis of the ram or parallel to the axis of the ram. If desired, rotary bearings 11 can be provided to ensure that the rod 10 moves in a truly linear manner.

A brake, indicated by the reference numeral 15, is mounted on the frame of a machine incorporating the ram and comprises an elongate plate 17 provided with a hole 19, the shape and size of which is just larger than the cross-sectional shape and size of the rod 10. The plate 17 is pivotally mounted at one end 20 and is contacted at its other end 21 by a brake inhibiter 23 which is arranged to hold the plate 17 in a position such that the rod 10 passes freely through the hole 19 without contacting the edge of the hole. Preferably this is when the plate 17 is at right angles to the axis or direction of movement of the rod 10.

The brake inhibiter 23 is an electrically actuated device such as a solenoid, in this case a rotary solenoid 23a, which in normal use when electrical power is available, holds the plate 17 in its "off" condition by means of an actuator lever 23b but when electrical power is not available, exerts little or no force on the plate 17 and thus allows it to pivot under the action of gravity so that the edge of the hole 19 contacts the rod 10 and causes the rod to jam as it tries to drop, also under the action of gravity.

It is important that in its "off" condition the brake imparts no friction to the rod 10 and this is achieved in the present embodiment by means of a limit stop 25 fixed to the frame and against which the brake inhibiter 23 presses the plate 17. Accurate position of the hole 19 with respect to the rod 10 is achieved using an insert 24 which fits in the hole 19 and forms a bore through which the rod 10 passes. The insert 24 has a projecting portion, the external surface of which is conical and is arranged to be received in a tapering hole 26 in the limit stop 25.

We prefer to limit the amount of braking force which can be generated by this arrangement so as to enable ready resetting of the apparatus. This is achieved by arranging the pivot for the end 20 of the plate 17 to be resiliently mounted by means of a spring 28 and for the plate to be provide with a projection 30 arranged to be spaced from a fixed surface 31 positioned below the plate. The spring 28 provides a biasing force acting in a direction opposite to the force of gravity. In this way, should excess force be applied in a downward direction after the brake has been activated, the plate can be pulled downwards against the spring force until the projection 30 contacts the fixed surface 31 whereupon the plate will tend to pivot about the projection 30 against the spring force so as to permit movement of the rod 10 through the hole 19. It will be appreciated that should this excess force be removed, the braking action will be immediately restored and the rod held in its new position.

The spring 28 limits the braking force to a value which can be readily released simply by activating the rotary solenoid 23a. As shown in FIG. 1, when the brake is in its 'off' condition, the free end of the actuator lever 23b contacts the plate 17 some distance in from the end 21 which results in little force needing to be generated by the rotary solenoid 23a to hold the brake in this condition.

However, in the event that the brake is applied, i.e. there is no power to the solenoid 23a, the plate 17 moves downwards until it jams against the rod 10. This in turn causes the lever 23b to be rotated downwards until the top end 21 comes into contact with the lever 23b near its pivot point. When power is restored, and the brake is to be released, a high force is required and it is preferred to inject a pulse of energy from one or more capacitors into the solenoid to release the brake. Thus, the brake control arrangement is such that there is a low holding force in normal operation but a high instantaneous force for releasing the brake using the same solenoid as is used for supplying the holding force.

Various modifications may be made to the above arrangement. For example, the rotary solenoid can be replaced by a simpler arrangement. Also, the limit stop 25 can be a tubular member through which the rod 10 passes but could equally well be a simple stop arranged at any suitable position where it can be contacted by the plate 17. Movement of the plate 17 to its operative, jamming position can be assisted by one or more springs if desired.

The above-described arrangement is particularly effective when used in a testing apparatus where an electromagnetic ram is positioned above the test sample location. It can be used in other arrangements such as when hydraulic rams are present as the brake will be effective to prevent sinking of the hydraulic ram.

The invention claimed is:

1. A mechanical brake for arresting movement of the armature of a linear electric motor in the absence of electrical power comprising a pivotably mounted plate having an aperture for receiving a member attached to the armature of the motor, and an electrically operated pivotably mounted lever contacting a free end of the plate and arranged to hold the plate in a condition to permit movement of the member while electrical power is present wherein a free end of the lever contacts the plate at a first location and to permit the plate to pivot to a jamming position in the absence of electrical power wherein the free end of the plate contacts the lever at a second location, wherein the second location is closer to the pivot of the lever than the first location, wherein the plate is pivotably mounted on a member which is capable of movement against a biasing force acting in a direction opposite to gravity, thereby to limit the amount of force applied by the brake.

2. A mechanical brake according to claim 1, and comprising a stop member, the electrically operated pivotably mounted lever being arranged to hold the plate against the stop while electrical power is present.

3. A mechanical brake according to claim 1, and comprising a projection disposed below the plate and arranged to contact a fixed surface in the event the biasing force is exceeded.

4. A mechanical brake according to claim 3 wherein a solenoid is provided to hold the plate in the condition to permit movement of the member.

5. A mechanical brake according to claim 4, and comprising means for applying a pulsive energy to the solenoid in order to release the plate from the jamming position.

6. A mechanical brake according to claim 4, wherein the solenoid is rotary solenoid.

7. A ram device having a piston and cylinder arrangement, the piston being provided with a rod member, and a mechanical brake according to claim 1 acting on the rod member.

* * * * *